United States Patent [19]

Franzen et al.

[11] Patent Number: 5,236,691
[45] Date of Patent: Aug. 17, 1993

[54] TERNARY METAL-RICH SULFIDE WITH A LAYERED STRUCTURE

[75] Inventors: Hugo F. Franzen; Xiaoqiang Yao, both of Ames, Iowa

[73] Assignee: Iowa State University Research Foundation, Inc., Ames, Iowa

[21] Appl. No.: 666,572

[22] Filed: Mar. 8, 1991

[51] Int. Cl.$^5$ ............... C01B 17/00; C01G 33/00; C01G 35/00
[52] U.S. Cl. ................................... 423/561.1
[58] Field of Search ............ 423/560, 561.1, 562, 423/565

[56] References Cited

U.S. PATENT DOCUMENTS

| | | | |
|---|---|---|---|
| 3,763,043 | 10/1973 | Thompson | 423/561.1 |
| 3,940,472 | 2/1976 | Donohue | 423/508 |
| 4,323,480 | 4/1982 | Dines et al. | 423/561.1 |
| 4,647,386 | 3/1987 | Jamison | 423/561.1 |
| 4,735,875 | 4/1988 | Anderman et al. | 429/218 |
| 4,996,108 | 2/1991 | Divigalpitiya et al. | 423/561.1 |
| 5,051,204 | 9/1991 | Ohsawa et al. | 423/508 |

OTHER PUBLICATIONS

M. S. Whittingham, Prog. in Solid Chem., 1978 pp. 41–99 Chemistry of Intercalacation Compounds: Metal Guests in Chalcogenide Hosts.
B. Harbrecht, Angew, Chem. Int. Ed. Engl., 1989 Ta$_2$Se: A Tantalum-Rich Selenide with a New Layer Structure.
H. F. Franzen et al, The Crystal Structure of Nb$_{21}$S$_8$, 1968 Acta Crystallographics, vol. B24, Part 3.
H. Y. Chen et al, Preparation and Crystal of NB$_{14}$S$_5$, 1973.
H. F. Franzen et al, The Crystal Structure of Ta$_2$S, 1969 Acta Crystallographics vol. B25 Part 9 pp. 1736–1741.
H. F. Franzen et al, The Crystal Structure of Ta$_6$S, 1969 Atca Cryst. B26 pp. 125–129.
B. R. Conrad et al, The Crystal Structure of Nb$_2$Sem 1969 Acta Cryst. B25 pp. 1729–1736.
B. Harbrecht, Die Trikline Modifikation von Ta$_6$Se, 1988 J. Less Common Metals vol. 138 pp. 225–234.
X. Yao et al, The Crystal Structure of a New Ternary Metal-Rich Sulfide Ta$_{6.08}$Nb$_{4.92}$S$_4$, J. Solid State Chemistry 1990 vol. 86 pp. 88–93.
X. Yao et al, Preparation and Crystal Structure of Nb$_{6.74}$Ta$_{5.26}$S$_4$.
D. G. Adolphson et al, Crystal Structure of Zirconium Monochloride. A Novel Phase Containing Metal–Metal Bonded Sheets, 1976 Inorganic Chemistry vol. 15 #8 pp. 1820–1823.

*Primary Examiner*—Gary P. Straub
*Attorney, Agent, or Firm*—Tilton, Fallon, Lungmus & Chestnut

[57] ABSTRACT

A ternary Nb-Ta-S compound is provided having the atomic formula, Nb$_{1.72}$Ta$_{3.28}$S$_2$, and exhibiting a layered structure in the sequence S-M3-M2-M1-M2-M3-S wherein S represents sulfur layers and M1, M2, and M3 represent Nb/Ta mixed metal layers. This sequence generates seven sheets stacked along the [001] direction of an approximate body centered cubic crystal structure with relatively weak sulfur-to-sulfur van der Waals type interactions between adjacent sulfur sheets and metal-to-metal bonding within and between adjacent mixed metal sheets.

2 Claims, 2 Drawing Sheets

TERNARY METAL-RICH SULFIDE WITH A LAYERED STRUCTURE

FIELD OF THE INVENTION

The present invention relates to a ternary Nb-Ta-S compound with a layered crystal structure that includes mixed metal (Nb/Ta) layers interposed between layers of sulfur atoms.

BACKGROUND OF THE INVENTION

The layered disulfides (e.g. $TiS_2$, $MoS_2$, $NbS_2$, etc.) have been studied extensively as a result of their propensity to intercalate both organic and inorganic substances into an interlayer van der Waals gap between adjacent sulfide layers. Such disulfides are described by M. Whittingham, in *Prog. in Solid State Chem.*, 1978, page 41.

Metal-rich sulfides and selenides, such as $Nb_{21}S_8$, $Nb_{14}S_5$, $Ta_2S$, $Ta_6S$, $Nb_2Se$, and $Ta_2Se$, are known to exhibit different crystal structures. In particular, the coordinations for the metal and sulfur in the Nb-rich sulfides and Ta-rich sulfides are strikingly different. For example, in the Nb-rich sulfides, $Nb_{21}S$ and $Nb_{14}S_5$, the metal (Nb) coordinations are capped pentagonal prisms and capped distorted cubes while the coordinations of sulfur are capped trigonal prisms. On the other hand, in the Ta-rich sulfides, $Ta_2S$ and $Ta_6S$, the structures can be viewed as Ta clusters consisting of linear chains of facing-sharing pentagonal antiprisms which interact via direct metal-to-metal interactions and via sulfur bridges.

The technical article by Dr. B. Harbrecht in Angew. Chem. Int. Ed. Engl. 1989, p. 1660, describes crystalline $Ta_2Se$ that exhibits a layered structure comprising a sequence of Se-Ta-Ta-Ta-Ta-Se homoatomic layers in a body centered cubic (bcc) arrangement when the difference in the kinds of atoms involved is neglected. As is apparent, the homoatomic Ta layers (four in number) are interposed between layers of Se.

SUMMARY OF THE INVENTION

The present invention provides a novel ternary Nb-Ta-S compound having the approximate atomic formula, $(Nb_{1-x}Ta_x)_5S_2$ where $x \neq 0.6$, exhibiting a layered structure in the sequence S-M3-M2-M1-M2-M3-S wherein S represents sulfur layers and M1, M2, and M3 represent Nb/Ta mixed metal layers. In effect, this sequence generates seven sheets or layers stacked along the [001] direction of a body centered cubic type crystal structure with relatively weak sulfur-to-sulfur van der Waals type interactions between adjacent sulfur sheets in contrast to metal-to-metal binding within and between adjacent mixed metal sheets. An exemplary ternary compound of the invention is described by the atomic formula, $Nb_{1.72}Ta_{3.28}S_2$.

DETAILED DESCRIPTION OF THE INVENTION

Figure 1:
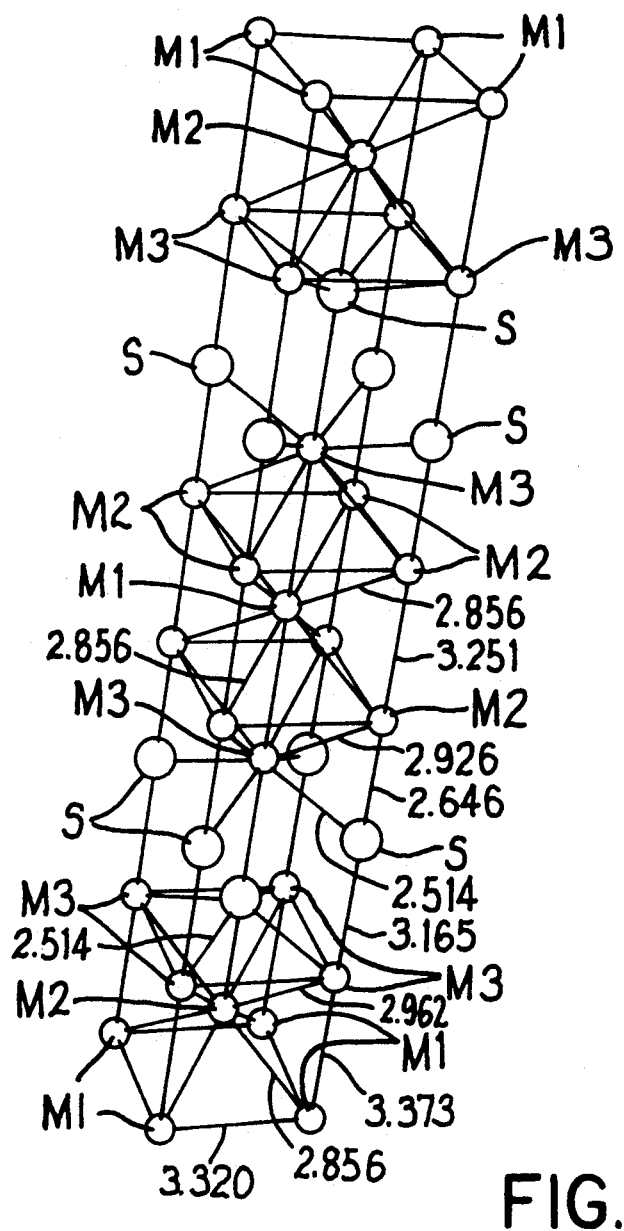
FIG. 1 is a representation of one unit cell of the exemplary $Nb_{1.72}Ta_{3.28}S_2$ compound wherein the larger circles represent sulfur atoms.

The exemplary $Nb_{1.72}Ta_{3.28}S_2$ compound of the invention was prepared using high temperature techniques and initial $Ta_2S$ and "$Nb_2S$" reactants. In particular, the initial $Ta_2S$ reactant was synthesized by putting elemental Ta (available from Alpha Co.) and S (available from Fisher Scientific Co.) in the correct molar ratio into an out-gassed silica tube, then heating at 440° C. until the yellow color of sulfur disappeared, and finally fixing the temperature at 800° C. for three days. The other initial reactant, "$Nb_2S$", was synthesized by the same procedure from elemental Nb (available from Alpha Co.) and elemental S. The reactant "$Nb_2S$" is enclosed in quotation marks to represent that it is an as-synthesized composition and not a compound, since there is no known compound with the stoichiometry, $Nb_2S$. A pellet comprising a mixture of the $Ta_2S$ and "$Nb_2S$" reactants ($n_{Ta_2S}$:$n_{Nb_2S}$=3:1 molar ratio) was arc-melted under Ar gas (1 atm. Pa) on a water-cooled copper plate with a tungsten electrode.

The arc-melted sample exhibited facile shearing characteristic of layered compounds. The X-ray diffraction powder pattern of the arc-melted sample showed that the major phase was a novel compound; i.e., $Nb_{1.72}Ta_{3.28}S_2$, crystallized in space group I4/mmm with unit cell dimensions of a=3.3203 Å and c=21.619 Å with Z=2 where Z is the number of formula units per unit cell. The widths of the powder pattern lines indicated that the sample was not well crystallized.

Intensity data were obtained from a crystal (size=0.02×0.02.0.25 mm$^3$) cut from the arc-melted sample and mounted on a RIGAKU AFC6 single-crystal diffractometer using monochromatic Mo K$\alpha$ radiation, employing the well known 2$\theta$-w scan technique up to 60° (2$\theta$). Data were obtained for 124 unique reflections with $F^2 > 3\sigma$ ($F_o^2$) where F and $F_o$ are structure factors. The observed intensities were corrected for Lorentz polarization and adsorption effects with an absorption coefficient of 795.13 cm$^{-1}$. Subsequent data processing and structure calculations were performed with the program package TEXSEN available from Molecular Structure Corporation.

The structure of the exemplary compound was solved in the space group I4/mmm using the known direct method. The atomic formula was determined from the refinement to be $Nb_{1.72}Ta_{3.28}S_2$. The absorption correction (DIFABS) was applied after the isotropic refinement with the transmission factor ranging from 0.731 to 1.270. The refinement data are set forth in Table I. Each metal position was occupied by both Nb and Ta.

TABLE I

Final Cell, Refinement, and Atom Parameters for $Nb_{1.72}Ta_{3.28}S_2$
Tetragonal, Space Group I4/mmm
a = 3.3203 (9), c = 21.619 (12) Å, Z = 2
124 unique reflections (I ≧ 3$\sigma_f$), 15 variables
R = 0.035, $R_w$ = 0.038

|    | occupancy | Z | $B_{eq}$ (Å$^2$) | $U_{11}$ | $U_{33}$ |
| --- | --- | --- | --- | --- | --- |
| M1 | 88.3% Ta + 11.7% Nb | 0 | 0.98 (9) | 0.011 (1) | 0.015 (2) |
| M2 | 82.6% Ta + 17.4% Nb | 0.4248 (1) | 0.68 (5) | 0.0098 (7) | 0.006 (1) |
| M3 | 37.3% Ta + 62.7% Nb | 0.1560 (1) | 0.74 (8) | 0.009 (1) | 0.010 (2) |

TABLE I-continued

Final Cell, Refinement, and Atom Parameters for $Nb_{1.72}Ta_{3.28}S_2$
Tetragonal, Space Group I4/mmm
a = 3.3203 (9), c = 21.619 (12) Å, Z = 2
124 unique reflections (I ≧ 3σ_I), 15 variables
R = 0.035, R_w = 0.038

| | occupancy | Z | $B_{eq}(Å^2)$ | $U_{11}$ | $U_{33}$ |
|---|---|---|---|---|---|
| S | | 0.3024 (4) | 0.7 (2) | 0.011 (4) | 0.005 (6) |

Note:
Cell parameters are obtained from indexing of the powder pattern; x, y = 0 for all atoms; $U_{22} = U_{11}$, $U_{ij} = 0$; $R = \Sigma||F_o| - |F_c||/\Sigma|F_o|$.
$R_w = [\Sigma w(|F_o| - |F_c|)^2/\Sigma w(F_o)^2]^{\frac{1}{2}}$; $w = \sigma_F^{-2}$; $B_{eq} = 8\pi^2(U_{11} + U_{22} + U_{33})/3$.

The arc-melted sample was also analyzed by electron dispersive analysis by X-rays (EDAX) in a scanning electron microscope, and the major phase was found to consist of Ta, Nb and S elements with minor W and Cu coming from arc-melting.

Figure 2:
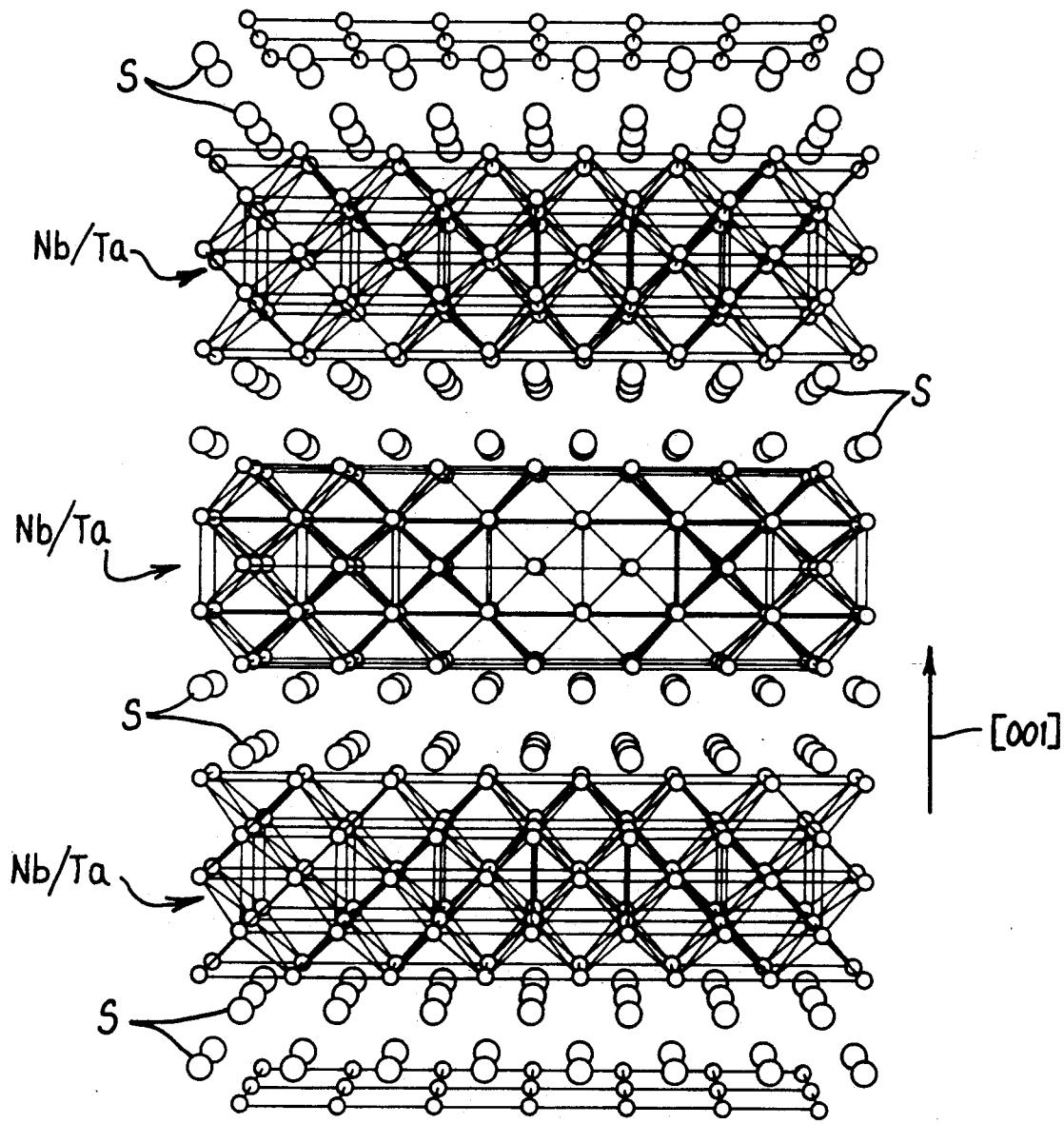
FIG. 2 is a representation of the crystal structure of the exemplary $Nb_{1.72}Ta_{3.28}S_2$ compound along the z direction (i.e., c-axis or dimension of the bcc cell) wherein the larger circles represent sulfur atoms.

FIG. 1 is a representation of one unit cell of the exemplary $Nb_{1.72}Ta_{3.28}S_2$ compound. FIG. 2 represents the structure of the exemplary compound viewed along the z-direction; i.e., the [001]crystal direction. The structure can be viewed as an elemental Nb or Ta body centered cubic (bcc) type in which two neighboring layers in every seven layers are replaced by sulfur. Thus, there are some distortions relative to the bcc structure, e.g., the metal cube consisting of eight M2 contracts along the c-axis while the cube of four M1 and four M3 expands along the c-axis with M2 deviating slightly from the center of the cube. FIGS. 1 and 2 reveal the structure; namely, seven homoatomic layers or sheets in the sequence S-M3-M2-M1-M2-M3-S wherein S represents sulfur layers and M1, M2, M3 represent Nb/Ta mixed metal layers. The geometry of the difference in kinds of atoms is neglected.

The coordination of the MI position was determined to be as follows: eight M2 atoms (2.856 Å apart) at the corners of a distorted capped cube, four M1 (3.320 Å) and two M3 (3.373 Å) as capping atoms. Around the M2 atom there are four M1 atoms (2.856 Å apart) and four M3 (2.926 Å) at the corners of a distorted capped cube, five M2 atoms (four 3.320 Å and one 3.251 Å apart) and one S atom (2.646 Å apart) as capping atoms. The corners of the distorted capped cube around the M3 atom comprise four M2 atoms (2.926 Å apart) and four S atoms (2.514 Å apart) while the capping atoms are one M1 atom (3.373 Å apart) and four M3 atoms (3.320 Å apart), respectively.

As the identifying number of the metal increases, the Nb/Ta ratio on that position also increases. The number of coordinating sulfur atoms for M1, M2 and M3 position are 0, 1 and 4, respectively; i.e., the more Nb in the position, the more S is bonded to that position. The shortest distance between S atoms (3.26 Å) in neighboring layers indicates interlayer van der waals interactions, consistent with the graphitic character of the exemplary compound and its tendency to disorder.

The ternary Nb-Ta-S compound of the invention exhibits a crystal structure that provides a high catalytic surface area that may be beneficial as a hydrodesulfurization catalyst, as an intercalation battery component, etc. The compound of the invention will also find use in studying intercalation of organic and inorganic substances.

While the invention has been described in terms of specific embodiments thereof, it is not intended to be limited thereto but rather only to the extent set forth hereafter in the claims.

We claim:

1. A ternary Nb-Ta-S compound having the atomic formula, $Nb_{1.72}Ta_{3.28}S_2$, and having a layered structure comprising the sequence S-M3-M2-M1-M2-M3-S wherein S represents sulfur layers and M1, M2, and M3 each represent mixed Nb/Ta metal layers forming a body centered type crystal structure, said sequence occurring along the [001] direction of said crystal structure.

2. The compound of claim 1 wherein said M1 and M2 layers each comprise a majority of Ta atoms and a minority of Nb atoms and said M3 layer comprises a majority of Nb atoms and a minority of Ta atoms.

* * * * *

UNITED STATES PATENT AND TRADEMARK OFFICE
CERTIFICATE OF CORRECTION

PATENT NO. : 5 236 691

DATED : August 17, 1993

INVENTOR(S) : Hugo F. FRANZEN et al

It is certified that error appears in the above-identified patent and that said Letters Patent is hereby corrected as shown below:

Column 1, line 46; change "$\neq$" to ---$\simeq$---.

Signed and Sealed this

Twenty-ninth Day of March, 1994

Attest:

BRUCE LEHMAN

*Attesting Officer*  *Commissioner of Patents and Trademarks*